United States Patent
Endo et al.

(10) Patent No.: US 7,622,547 B2
(45) Date of Patent: Nov. 24, 2009

(54) PROCESS AND ACTIVATED CARBON CATALYST FOR RING-OPENING POLYMERIZATION OF LACTONE COMPOUNDS

(75) Inventors: Toshio Endo, Ohtake (JP); Hidetoshi Omori, Ohtake (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 0 days.

(21) Appl. No.: 11/795,794

(22) PCT Filed: Feb. 3, 2006

(86) PCT No.: PCT/JP2006/301852

§ 371 (c)(1),
(2), (4) Date: Jul. 23, 2007

(87) PCT Pub. No.: WO2006/085484

PCT Pub. Date: Aug. 17, 2006

(65) Prior Publication Data

US 2008/0125568 A1   May 29, 2008

(30) Foreign Application Priority Data

Feb. 10, 2005  (JP) .............................. 2005-034768

(51) Int. Cl.
C08G 63/08   (2006.01)
(52) U.S. Cl. ...................... 528/354; 528/355; 528/359; 528/271; 528/425
(58) Field of Classification Search ................. 528/272, 528/271, 354, 425, 115, 355, 359, 403, 408; 549/204; 525/532, 533; 508/222
See application file for complete search history.

(56) References Cited

U.S. PATENT DOCUMENTS 4,399,310 A * 8/1983 Greco ........................ 568/346
4,663,429 A * 5/1987 Murai et al. ................ 528/355
2003/0114704 A1* 6/2003 Fuchs ......................... 560/155
2005/0080226 A1 4/2005 Watanabe

FOREIGN PATENT DOCUMENTS

| EP | 1 473 315 A1 | 11/2004 |
|---|---|---|
| JP | 1-49340 B2 | 10/1989 |
| JP | 2000-7765 A | 1/2000 |

* cited by examiner

*Primary Examiner*—Ling-Siu Choi
*Assistant Examiner*—Frances Tischler
(74) *Attorney, Agent, or Firm*—Birch, Stewart, Kolasch & Birch, LLP

(57) ABSTRACT

A lactone compound represented by following General Formula (1), such as ε-caprolactone, is reacted in the presence of a powdered activated carbon where necessary with an initiator such as a polyhydric alcohol, an aliphatic alcohol, or an aliphatic carboxylic acid to thereby yield, for example, a polylactone, a polylactone alkyl ether, or a polylactone alkyl ester.

[Chemical Formula 1]

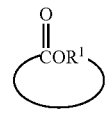

(1)

Wherein $R^1$ is an alkylene group having two to eighteen carbon atoms which may be substituted with one or more alkyl groups each having one to ten carbon atoms. Accordingly, a target compound can be produced in a high yield with high quality, from which the catalyst can be easily removed.

13 Claims, No Drawings

PROCESS AND ACTIVATED CARBON CATALYST FOR RING-OPENING POLYMERIZATION OF LACTONE COMPOUNDS

TECHNICAL FIELD

The present invention relates to a process for ring-opening polymerization of lactone compounds using an activated carbon as a catalyst, and to a catalyst for ring-opening polymerization of lactone compounds.

BACKGROUND ART

Ring-opening polymerization is a polymerization process in which polymerization proceeds as a result of ring opening of a cyclic compound as a monomer to synthetically yield a polymer. Industrially important synthetic polymers such as nylons (polyamides), polyesters, polyethers, polyethyleneimines, and polysiloxanes are now produced through ring-opening polymerization. P In general, a catalyst must be added to a reaction system so as to develop ring-opening polymerization. The catalyst herein acts upon the cyclic compound and accelerates its ring-opening reaction. For example, catalysts for cation-reactive monomers such as cyclic ethers, cyclic formals, and cyclic imines include Lewis acids such as $BF_3 \cdot O(C_2H_5)_2$, $SnCl_4$, and $AlCl_3$; alkyl halides such as alkyl chlorides and alkyl bromides; super strong acids such as $CF_3SO_3H$; esters of super strong acids, such as $CF_3SO_3R$, wherein R represents an alkyl group; and cation salts such as $R_3C^+PF_6^-$ and $R_3O^+BF_4^-$, wherein R represents an alkyl group. Catalysts for anion-reactive monomers such as cyclic siloxanes, lactams, and acid anhydrides include Li, Na, K, RCOONa, RONa, and $R_2NLi$, wherein R represents an alkyl group. As a catalyst for a fluorooxetane, there is disclosed an alkali metal fluoride supported on a support such as an activated carbon. In this catalyst, however, the active site is the alkali metal fluoride, and the activated carbon only plays a role as a support (Patent Document 1). Catalysts for coordinate anion-reactive monomers such as cyclic ethers and lactones include, for example, $(C_2H_5)_2Zn$—$H_2O$, $(C_2H_5)_2Zn$—ROH, and $AlR_3$-acetylacetone-$H_2O$, wherein R represents an alkyl group; and those for metathesis reactive monomers such as cyclic olefins include $MoCl_5$ and $WCl_6$.

However, when these known catalysts are used, 1) side reactions other than polymerization may occur, and/or 2) residual catalysts, if remained in the resulting polymers, may exhibit some toxicity or may cause deterioration in performance of the polymers.

In contrast, activated carbons have been known to be used as adsorbents and supports for solid catalysts, but have not yet been known to be usable, if used alone, as catalysts for ring-opening polymerization.

Patent Document 1: Japanese Examined Patent Application Publication No. 1-49340 (claim 5)

DISCLOSURE OF INVENTION

Problems to be Solved by the Invention

Accordingly, an object of the present invention is to provide a process for ring-opening polymerization of lactone compounds using a catalyst that has an excellent catalytic activity, does not cause side reactions, is separated from a produced polymer through filtration, thereby does not remain in the polymer, and does not cause deterioration in safety and performance of the polymer. Another object of the present invention is to provide a catalyst for use in the polymerization process.

Means for Solving the Problems

After intensive investigation, the present inventors found that the above objects are achieved by using an activated carbon as a catalyst in ring-opening polymerization. The present invention has been made based on these findings.

Specifically, according to a first embodiment of the present invention, there is provided a process for ring-opening polymerization, in which the polymerization proceeds through ring opening of at least one lactone compound (a) as a monomer. The process includes the step of using an activated carbon as a catalyst.

According to a second embodiment of the present invention, there is provided a process for ring-opening polymerization according to the first embodiment of the present invention, in which the activated carbon is a powdered activated carbon.

According to a third embodiment of the present invention, there is provided a process for ring-opening polymerization according to one of the first and second embodiments, in which the ring-opening polymerization is ring-opening homopolymerization of one lactone compound (a) or ring-opening copolymerization of two or more different lactone compounds (a).

According to a fourth embodiment of the present invention, there is provided a process for ring-opening polymerization according to any one of the first, second, and third embodiments, in which the lactone compound (a) includes a compound represented by following General Formula (1):

[Chemical Formula 1]

(1)

wherein $R^1$ represents an alkylene group having two to eighteen carbon atoms, which may be substituted with one or more alkyl groups each having one to ten carbon atoms.

There is also provided, according to a fifth embodiment of the present invention, a process for ring-opening polymerization according to the fourth embodiment, in which the lactone compound (a) includes at least one selected from the group consisting of β-propiolactone, β-butyrolactone, β-valerolactone, γ-butyrolactone, γ-valerolactone, γ-caprylolactone, δ-valerolactone, β-methyl-δ-valerolactone, δ-stearolactone, ε-caprolactone, 2-methyl-ε-caprolactone, 4-methyl-ε-caprolactone, ε-caprylolactone, and ε-palmitolactone.

According to a sixth embodiment of the present invention, there is provided a process for ring-opening polymerization according to the fifth embodiment, in which the lactone compound (a) includes ε-caprolactone.

There is also provided, according to a seventh embodiment of the present invention, a process for ring-opening polymerization according to any one of the first, second, third, fourth, fifth, and sixth embodiments, in which the reaction of the lactone compound (a) is carried out using an active hydrogen-containing compound (b) as an initiator.

According to an eighth embodiment of the present invention, there is provided a process for ring-opening polymerization according to the seventh embodiment, in which water or a polyhydroxy compound is used as the active hydrogen-containing compound (b) to yield a polylactone.

In addition, there is provided, according to a ninth embodiment of the present invention, there is provided a process for ring-opening polymerization according to the seventh embodiment, in which an aliphatic alcohol is used as the active hydrogen-containing compound (b) to yield a polylactone aliphatic alkyl ester.

According to a tenth embodiment of the present invention, there is provided a there is provided a process for ring-opening polymerization according to the seventh embodiment, in which an aliphatic carboxylic acid is used as the active hydrogen-containing compound (b) to yield a polylactone aliphatic carboxylic acid ester.

In addition, there is provided, according to an eleventh embodiment of the present invention, a catalyst for ring-opening polymerization of lactone compounds (a), which includes any one of:

(1) an activated carbon alone;
(2) a support and a powdered activated carbon supported on the support;
(3) a granulated article of a powdered activated carbon; and
(4) a granulated article of a powdered activated carbon with another powdered material.

Advantages

According to the present invention, there is provided a process for ring-opening polymerization which uses an activated carbon as a catalyst. In this process, the activated carbon as the catalyst has an excellent catalytic activity, does not cause side reactions, is separated from a produced polymer through filtration, thereby does not remain in the polymer, and does not cause deterioration in safety and performance of the polymer. According to the present invention, there is also provided an activated carbon for use in the polymerization process.

BEST MODE FOR CARRYING OUT THE INVENTION

[Lactone Compound (a)]

Lactone compounds (a) used as monomers are not specifically limited, as long as they can undergo ring-opening polymerization in the presence of an activated carbon catalyst. Examples of lactone compounds (a) for use in the present invention include compounds represented by following General Formula (1):

[Chemical Formula 2]

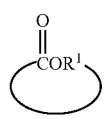

(1)

wherein $R^1$ represents an alkylene group having two to eighteen carbon atoms, which may be substituted with one or more alkyl groups each having one to ten carbon atoms.

Preferred examples of lactone compounds (a) include β-propiolactone, β-butyrolactone, β-valerolactone, γ-butyrolactone, γ-valerolactone, γ-caprylolactone, δ-valerolactone, β-methyl-δ-valerolactone, δ-stearolactone, ε-caprolactone, 2-methyl-ε-caprolactone, 4-methyl-ε-caprolactone, ε-caprylolactone, and ε-palmitolactone. In this connection, cyclic dimers such as glycolides and lactides can also be used as monomers in ring-opening polymerization, as with lactones.

Likewise, cyclic carbonate compounds such as ethylene carbonate, 1,3-propylene carbonate, neopentyl carbonate, 2-methyl-1,3-propylene carbonate, and 1,4-butanediol carbonate can be used herein.

The term "ring-opening homopolymerization" in the present invention refers to ring-opening polymerization of one lactone compound (a), and the term "ring-opening copolymerization" refers to ring-opening polymerization of two or more different lactone compounds (a). Monomers for use in ring-opening copolymerization include, in addition to the lactone compounds (a), oxirane compounds such as ethylene oxide, propylene oxide, butylene oxide, a-olefin epoxides having six to thirty carbon atoms, styrene oxide, glycidol, and epichlorohydrin.

[Activated Carbon]

Activated carbons for use as catalysts in the present invention can be articles known as porous carbonaceous absorbents. These activated carbons can be prepared by carbonizing carbonaceous materials through heat treatment, and activating the carbonized materials. Examples of such carbonaceous materials include vegetable-derived (plant-derived) natural carbonaceous materials such as coal, cokes, pitch, bone charcoal, vegetable charcoal, coconut shells/wood, sawdust, and lignin; animal-derived natural carbonaceous materials such as beef bones; organic polymers including synthetic resins such as phenolic resins and polyacrylonitriles; and soot.

Activated carbons for use in the present invention can be either activated carbons themselves or articles partially containing activated carbons. Such activated carbons can be, for example, an activated carbon supported on a support such as a plastic, a mineral, a ceramic, or a fiber; a granulated article (granules) prepared by granulating a powdered activated carbon with a binder; and a granulated article of a powdered activated carbon with a powder typically of a mineral or a ceramic. Some materials such as bone charcoal, vegetable charcoal, graphite, and carbon black may structurally partially contain activated carbons. In this case, these materials can also be used as the articles partially containing activated carbons in the present invention.

The specific surface area of an activated carbon for use in the present invention is not specifically limited, as long as being 500 m$^2$/g or more, and is preferably 750 m$^2$/g or more, and more preferably 900 m$^2$/g or more, with its upper limit generally being about 3000 m$^2$/g.

An activated carbon for use in the present invention can have any shape such as granular, powdery, fibrous, sheet-like, or honeycomb-like shape. Examples of granular activated carbons include products supplied from Calgon Mitsubishi Chemical Corporation (former Toyo Calgon Co., Ltd.) under the trade names of F400, F300, PCB, BPL, CAL, CPG, and APC; products supplied from Japan EnviroChemicals, Ltd. under the trade names of Granular Shirasagi WH and Granular Shirasagi C; a product supplied from Kuraray Chemical Co., Ltd. under the trade name of Kuraraycoal KW; and a product supplied from Kureha Corporation under the trade name of BAC. Examples of powdered activated carbons include products supplied from Japan EnviroChemicals, Ltd. under the trade names of Shirasagi A and Shirasagi C. Examples of fibrous activated carbon include a product supplied from Toho Rayon Co., Ltd. under the trade name of FX-300; a product supplied from Osaka Gas Co., Ltd. under the trade name of M-30; and a product supplied from Toyobo Co., Ltd. under the trade name of KF-1500. Examples of sheet-like activated carbons include a product supplied from Kanebo, Ltd. under the trade name of Microlite AC.

The amount of an activated carbon is not specifically limited but is preferably 0.01 to 10 parts by weight, and more preferably 0.1 to 1 parts by weight, to 100 parts by weight the lactone compounds (a).

[Active Hydrogen-containing Compound]

According to an embodiment of the present invention, ring-opening homopolymerization or ring-opening copolymerization with another lactone compound (a) can be carried out using an active hydrogen-containing compound (b) as an initiator. The "active hydrogen-containing compound (b)" refers to, for example, a compound having one or more of hydroxyl group, carboxyl group, amino group and/or thiol group.

Examples of such active hydrogen-containing compounds (b) include water; diols such as ethylene glycol, propylene glycol, butanediol, neopentyl glycol, and hexanediol; ether diols as condensates of these; and trifunctional or higher polyhydroxy compounds such as glycerol, trimethylolethane, trimethylolpropane, pentaerythritol, and dipentaerythritol. Products prepared by using these are referred to as polylactones in the present invention.

The active hydrogen-containing compounds (b) further include monohydroxy compounds. Among them, aliphatic, alicyclic, or aromatic alcohols having one to thirty carbon atoms are preferred, of which aliphatic alcohols are more preferred. More specific examples thereof include lower alcohols having one or more carbon atoms, and higher alcohols having ten or more carbon atoms. Products derived from these compounds, if used as active hydrogen-containing compounds (b), are corresponding alcohol esters of polylactones having terminal hydroxyl group. The use of an aliphatic alcohol, for example, as an active hydrogen-containing compound (b) yields a polylactone aliphatic alkyl ester.

The active hydrogen-containing compounds (b) also include monocarboxy or polycarboxy compounds. Specific examples of such carboxy compounds include lower aliphatic carboxylic acids such as those ranging from formic acid, acetic acid to decanoic acid, polymerizable unsaturated carboxylic acids such as (meth)acrylic acids, and higher aliphatic carboxylic acids such as those ranging from lauric acid (dodecanoic acid) to stearic acid (octadecanoic acid); aliphatic saturated or polymerizable unsaturated dicarboxylic acids such as maleic acid, succinic acid, and adipic acid; alicyclic dicarboxylic acids such as cyclohexanedicarboxylic acid; aromatic dicarboxylic acids such as phthalic acid and analogues thereof; tricarboxylic acids such as propanetricarboxylic acid, trimellitic acid, and aminotriacetic acid; tetracarboxylic acids such as butanetetracarboxylic acid, pyromellitic acid, and ethylenediaminetetraacetic acid, and other polycarboxylic acids. Products from these compounds, if used as active hydrogen-containing compounds (b), are corresponding carboxylic acid esters of polylactones having terminal carboxyl group. The use of an aliphatic carboxylic acid, for example, as an active hydrogen-containing compound (b) yields a polylactone aliphatic carboxylic acid ester.

The reaction temperature and reaction time of ring-opening polymerization are not specifically limited. The ring-opening polymerization is carried out at temperatures of, for example, 100° C. to 200° C. preferably for one hour or longer and more preferably for five hours or longer.

A reaction system in ring-opening polymerization contains a cyclic compound as a monomer and an activated carbon as essential components. It may further contain, where necessary, one or more solvents as reaction diluents. Examples of such solvents (reaction diluents) include low molecular weight hydrocarbons such as aliphatic hydrocarbons having about four to about twelve carbon atoms; alicyclic hydrocarbons such as cyclohexane; aromatic hydrocarbons such as toluene; chain ethers such as those from dimethyl ether to ethylene glycol dimethyl ether; halogenated hydrocarbons such as chloroform; ketones such as acetone, methyl ethyl ketone, and cyclohexanone; amides such as N,N-dimethylformamide; and cyclic ethers such as tetrahydrofuran and dioxane.

A reaction may be carried out according to a batch mode, a semibatch mode, or a continuous mode. Reactors for use herein include stirred tank reactors; flow reactors such as packed columns; and fluidized bed reactors. The reaction is preferably carried out according to a procedure, in which an activated carbon as a catalyst is packed in a packed-column reactor to form a catalytic layer, and a lactone compound (a) alone or a mixture of a lactone compound (a) and an active hydrogen-containing compound (b) is allowed to pass through the catalytic layer. This procedure not only saves the time and efforts for filtering the catalyst but also enables easy reactivation and drying of a deactivated catalyst by allowing steam to pass through the catalytic layer.

A process for ring-opening polymerization of lactone compounds according to the present invention uses an activated carbon as a catalyst and thereby suppresses side reactions such as dimerization of lactones, as compared with known processes. In addition, it remarkably suppresses contamination of inorganic elements into products. Accordingly, it can yield lactone-ring-opened polymers having a content of by-produced lactone dimers of 0.1 percent by weight or less, preferably 0.05 percent by weight or less, or yield lactone-ring-opened polymers having contents of residual inorganic elements of each 0.1 ppm by weight or less. The process according to the present invention can also yield target products which are excellent in properties such as color (hue).

EXAMPLES

The present invention will be further illustrated with reference to several examples and comparative examples below, which, however, are never intended to limit the scope of the present invention. As an activated carbon, Shirasagi A supplied from Japan EnviroChemicals, Ltd. was used. Inorganic elements in target products were quantitatively determined by inductively coupled plasma (ICP) emission spectrometry. The inorganic elements herein are Al, As, Ba, Ca, Cd, Ce, Co, Cu, Cr, Ga, Ge, Fe, Hf, La, Li, Mg, Mn, Mo, Na, Ni, P, Pb, Pd, Sb, Se, Si, Sn, Sr, Ti, V, Zn, and Zr. Lactone dimers were quantitatively determined by gas chromatography. All percentages and ppm (parts per million) are by weight, unless otherwise specified.

Example 1

Preparation Example 1 of Polycaprolactonediol

In a 1-liter four-neck flask equipped with a nitrogen inlet tube, a stirrer, a condenser, a temperature controller, and a dropping cylinder were placed 2.0 mol (212.2 g) of diethylene glycol, 6.9 mol (787.8 g) of ε-caprolactone, and 5.0 g of the activated carbon, followed by heating to 180° C. Next, while keeping the reaction temperature to 180° C., a reaction was continued until the ε-caprolactone concentration in the reaction system became less than 0.5 percent by weight. After cooling, the activated carbon was removed from the reaction system through filtration, to yield about 950 g of a reaction product.

The resulting polycaprolactonediol had an American Public Health Association (APHA) color index of 20, an acid value of 0.1 KOH-mg/g, a moisture content of 0.02%, a hydroxyl value of 218 KOH-mg/g, a viscosity of 300 mPa·s (40° C.), a lactone dimer content of 0.01%, and contents of the inorganic elements of each 0.1 ppm or less.

Example 2

Preparation Example 1 of Polycaprolactonetriol

In a four-neck flask having the same configuration as in Example 1 were placed 1.25 mol (167.7 g) of trimethylolpropane, 7.3 mol (832.3 g) of $\epsilon$-caprolactone, and 5.0 g of the activated carbon, followed by heating to 180° C. Next, while keeping the reaction temperature to 180° C., a reaction was continued until the lactone compound concentration in the reaction system became less than 0.5 percent by weight. After cooling, the activated carbon was removed from the reaction system through filtration, to yield about 950 g of a reaction product.

The resulting polycaprolactonetriol had an APHA color index of 15, an acid value of 0.2 KOH-mg/g, a moisture content of 0.02%, a hydroxyl value of 210 KOH-mg/g, a viscosity of 1200 mPa·s (25° C.), a lactone dimer content of 0.02%, and contents of the inorganic elements of each 0.1 ppm or less.

Example 3

Preparation Example 2 of Polylactonetriol

In a four-neck flask having the same configuration as in Example 1 were placed 2.0 mol (268.4 g) of trimethylolpropane, 3.85 mol (439.0 g) of $\epsilon$-caprolactone, 2.92 mol (292.7 g) of $\delta$-valerolactone, and 5.0 g of the activated carbon, followed by heating to 180° C. Next, while keeping the reaction temperature to 180° C., a reaction was carried out until the total content of residual two lactone compounds in the system became 2 percent by weight or less based on the total amount of the two lactone compounds. Thereafter, the degree of vacuum in the system was gradually raised using a vacuum pump so that the residual two lactone compounds were removed to a total content of the two lactone compounds of 1 percent by weight or less. After cooling, the activated carbon was removed from the reaction system through filtration, to yield about 950 g of a reaction product.

The resulting polylactonetriol had an APHA color index of 20, an acid value of 0.06 KOH-mg/g, a moisture content of 0.01%, a hydroxyl value of 336 KOH-mg/g, a viscosity of 1120 mPa·s (25° C.), a lactone dimer content of 0.01%, and contents of the inorganic elements of each 0.1 ppm or less.

Example 4

Preparation Example 1 of Polylactone

Monocarboxylic Acid Ester
In a four-neck flask having the same configuration as in Example 1 were placed 0.50 mol (58.1 g) of caproic acid, 4.95 mol (565.2 g) of $\epsilon$-caprolactone, 2.94 mol (376.8 g) of 4-methylcaprolactone, and 5.0 g of the activated carbon, followed by heating to 180° C. Next, while keeping the reaction temperature to 180° C., a reaction was continued until the concentration of the lactone compounds in the system became less than 0.5 percent by weight based on the total amount of the lactone compounds. After cooling, the activated carbon was removed from the reaction system through filtration, to yield about 950 g of a reaction product.

The resulting polylactone monocarboxylic acid ester had an APHA color index of 20, an acid value of 27.9 KOH-mg/g, a moisture content of 0.02%, a hydroxyl value of 0.1 KOH-mg/g, a viscosity of 1530 mPa·s (25° C.), a lactone dimer content of 0.01%, and contents of the inorganic elements of each 0.1 ppm or less.

Example 5

Preparation Example 1 of Polylactone

Monohydroxymonocarboxylic Acid Ester
In a four-neck flask having the same configuration as in Example 1 were placed 0.50 mol (150.2 g) of 12-hydroxystearic acid, 4.46 mol (509.9 g) of $\epsilon$-caprolactone, 2.65 mol (339.9 g) of 4-methylcaprolactone, and 5.0 g of the activated carbon, followed by heating to 180° C. Next, while keeping the reaction temperature to 180° C., a reaction was continued until the concentration of the lactone compounds in the system became less than 0.5 percent by weight based on the total amount of the lactone compounds. After cooling, the activated carbon was removed from the reaction system through filtration, to yield about 950 g of a reaction product.

The resulting polylactone monohydroxymonocarboxylic acid ester had an APHA color index of 20, an acid value of 26.9 KOH-mg/g, a moisture content of 0.02%, a hydroxyl value of 26.3 KOH-mg/g, a viscosity of 2510 mPa·s (25° C.), a lactone dimer content of 0.01%, and contents of the inorganic elements of each 0.1 ppm or less.

Comparative Example 1

Preparation Example 2 of Polylactone

Monohydroxymonocarboxylic Acid Ester
In a four-neck flask having the same configuration as Example 1 were placed 0.50 mol (150.2 g) of 12-hydroxystearic acid, 4.46 mol (509.9 g) of $\epsilon$-caprolactone, 2.65 mol (339.9 g) of 4-methylcaprolactone, and 0.01 g of stannous octoate, followed by heating to 180° C. Next, while keeping the reaction temperature to 180° C., a reaction was continued until the concentration of the lactone compounds in the system became less than 0.5 percent by weight based on the total amount of the lactone compounds. After cooling, about 950 g of a reaction product was obtained.

The resulting polylactone monohydroxymonocarboxylic acid ester had an APHA color index of 50, an acid value of 26.5 KOH-mg/g, a moisture content of 0.04%, a hydroxyl value of 26.9 KOH-mg/g, a viscosity of 2830 mPa·s (25° C.), a lactone dimer content of 0.18%, a Sn content of 3 ppm, and contents of the inorganic elements other than Sn of each 0.1 ppm or less.

INDUSTRIAL APPLICABILITY

According to the present invention, a high-quality target compound can be obtained in a high yield, because an activated carbon used herein has an excellent catalytic activity and thereby suppresses side reactions. The catalyst can be more easily separated and removed from the target product through filtration and less causes deterioration in safety and performance of the target product than known catalysts. Accordingly, a process according to the present invention is very excellent as a process for industrially producing ring-opened polymers of lactone compounds.

The invention claimed is:

1. A process for producing a ring-opening polymerization product selected from the group consisting of a polylactone, a polylactone aliphatic alkyl ester and a polylactone aliphatic carboxylic acid ester, by ring-opening polymerization that proceeds through ring opening of at least one lactone compound (a) as a monomer, the process comprising the step of carrying out a reaction of the lactone compound (a) using an activated carbon as a catalyst and using an active hydrogen-containing compound (b) as an initiator, the active hydrogen-containing compound (b) selected from the group consisting of water, diols, ether diols, trifunctional or higher polyhydroxy compounds, monohydroxy compounds, and monocarboxy or polycarboxy compounds.

2. The process for producing the ring-opening polymerization product according to claim 1, wherein the activated carbon comprises a powdered activated carbon.

3. The process for producing the ring-opening polymerization product according to claim 1, wherein the ring-opening polymerization is ring-opening homopolymerization of one lactone compound (a) or ring-opening copolymerization of two or more different lactone compounds (a).

4. The process for producing the ring-opening polymerization product according to claim 1, wherein the lactone compound (a) is a compound represented by following General Formula (1):

[Chemical Formula 1]

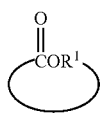

(1)

wherein $R^1$ represents an alkylene group having two to eighteen carbon atoms, which may be substituted with one or more alkyl groups each having one to ten carbon atoms.

5. The process for producing the ring-opening polymerization product according to claim 4, wherein the lactone compound (a) comprises at least one selected from the group consisting of β-propiolactone, β-butyrolactone, β-valerolactone, γ-butyrolactone, γ-valerolactone, γ-caprylolactone, δ-valerolactone, β-methyl-δ-valerolactone, δ-stearolactone, ε-caprolactone, 2-methyl-ε-caprolactone, 4-methyl-ε-caprolactone, ε-caprylolactone, and ε-palmitolactone.

6. The process for producing the ring-opening polymerization product according to claim 5, wherein the lactone compound (a) comprises ε-caprolactone.

7. The process for producing the ring-opening polymerization product according to one of claims 1 to 6, wherein the active hydrogen-containing compound (b) is water or a polyhydroxy compound and the product is a polylactone.

8. The process for producing the ring-opening polymerization product according to one of claims 1 to 6, wherein the active hydrogen-containing compound (b) is an aliphatic alcohol and the product is a polylactone aliphatic alkyl ester.

9. The process for producing the ring-opening polymerization product according to one of claims 1 to 6, wherein the active hydrogen-containing compound (b) is an aliphatic carboxylic acid and the product is a polylactone aliphatic carboxylic acid ester.

10. The process for producing the ring-opening polymerization product according to claim 1, wherein the product contains by-produced lactone dimers with a content of 0.1 percent by weight or less.

11. The process for producing the ring-opening polymerization product according to claim 1, wherein the product contains at least one residual inorganic element selected from the group consisting of Al, As, Ba, Ca, Cd, Ce, Co, Cu, Cr, Ga, Ge, Fe, Hf, La, Li, Mg, Mn, Mo, Na, Ni, P, Pb, Pd, Sb, Se, Si, Sn, Sr, Ti, V, Zn, and Zr, and wherein each of the inorganic elements has a content of 0.1 ppm by weight or less.

12. The process for producing the ring-opening polymerization product according to claim 1, wherein the product has an American Public Health Association (APHA) color index of 20 or less.

13. The process for producing the ring-opening polymerization product according to claim 1, wherein the catalyst consists only of activated carbon.

* * * * *